(12) United States Patent
Lin (10) Patent No.: US 10,782,840 B1
(45) Date of Patent: Sep. 22, 2020

(54) TOUCH PANEL (71) Applicant: HANNSTOUCH SOLUTION INCORPORATED, Tainan (TW)

(72) Inventor: Sheng-Chia Lin, Tainan (TW)

(73) Assignee: HANNSTOUCH SOLUTION INCORPORATED, Tainan (TW)

( * ) Notice: Subject to any disclaimer, the term of this patent is extended or adjusted under 35 U.S.C. 154(b) by 0 days.

(21) Appl. No.: 16/654,023

(22) Filed: Oct. 16, 2019

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05)

(58) Field of Classification Search
CPC .. G06F 3/0446; G06F 3/04164; G06F 1/1637; G06F 3/047
See application file for complete search history.

(56) References Cited

U.S. PATENT DOCUMENTS

| | | | | |
|---|---|---|---|---|
| 2015/0077649 | A1* | 3/2015 | Lee | G06F 3/044 349/12 |
| 2015/0123924 | A1* | 5/2015 | Huang | G06F 1/1637 345/173 |
| 2016/0048248 | A1* | 2/2016 | Na | G06F 3/047 345/174 |
| 2017/0242508 | A1* | 8/2017 | Wu | G06F 3/044 |
| 2019/0339816 | A1* | 11/2019 | Hsu | G06F 3/0448 |

\* cited by examiner

*Primary Examiner* — Chanh D Nguyen
*Assistant Examiner* — Ngan T. Pham-Lu
(74) *Attorney, Agent, or Firm* — CKC & Partners Co., LLC (57) ABSTRACT

A touch panel includes first and second touch electrodes, an auxiliary touch electrode, plural counter touch electrodes, and first to third traces. The first electrode, the second touch electrode, and the auxiliary touch electrode respectively include first sub-touch electrodes, second sub-touch electrodes, and sub-auxiliary touch electrodes extending along a first direction. The first sub-touch electrodes are electrically connected to each other, second sub-touch electrodes electrically connected to each other, and sub-auxiliary touch electrodes electrically connected to each other. Two of the sub-auxiliary touch electrodes are respectively proximate to one of the first sub-touch electrodes and one of the second sub-touch electrodes. The counter touch electrodes are spaced apart from each other, in which the counter touch electrodes respectively extend along a second direction intersecting the first direction. The first to third traces are electrically connected to the first electrode, the second electrode, and the auxiliary touch electrode, respectively.

15 Claims, 7 Drawing Sheets

TOUCH PANEL

BACKGROUND

Technical Field

The present disclosure relates to touch panel.

Description of Related Art

In recent years, capacitive touch screens have become increasingly popular in electronic products. The capacitive touch screen is operated by the current sensing of the human body, and is a touch screen that senses touch signals through the characteristics of electrodes and human body. When human body (finger) touches screen, due to the effect of the electric field of the human body, a coupling capacitor is formed between the finger and a conductor layer of the touch screen, and a current generated by the upper electrode of the touch screen would flow to the touch point, such that the location of the touch point can be obtained by accurate calculation.

SUMMARY

According to some embodiments of the present invention, by designing each of the touch units to have two transmitting electrodes and one sensing electrode, or designing each of the touch units to have one transmitting electrode and two sensing electrodes, a touch position may be determined through the three electrodes. Such configuration may be beneficial to reduce the number of the traces regarding the transmitting electrodes or the receiving electrodes. Through the configuration, a narrow border design may be realized, or some shielding wires may be added to the peripheral region for electrically shielding adjacent traces, which in turn will improve the touch performance of the touch panel.

According to some embodiments of the present invention, a touch panel includes a substrate, a first touch electrode, a second touch electrode, a first auxiliary touch electrode, plural counter touch electrodes, and first to third traces. The substrate has an active region and a peripheral region. The first electrode includes plural first sub-touch electrodes electrically connected to each other and disposed over the active region of the substrate. The second touch electrode includes plural second sub-touch electrodes electrically connected to each other and disposed over the active region of the substrate. The first auxiliary touch electrode includes plural first sub-auxiliary touch electrodes electrically connected to each other and disposed over the active region of the substrate. Each of the first sub-touch electrodes, the second sub-touch electrodes, and the first sub-auxiliary touch electrodes extends along a first direction. A first one of the first sub-auxiliary touch electrodes is proximate to a first one of the first sub-touch electrodes, and a second one of the first sub-auxiliary touch electrodes is proximate to a first one of the second sub-touch electrodes. The counter touch electrodes are spaced apart from each other and over the active region of the substrate, in which the counter touch electrodes respectively extend along a second direction intersecting the first direction. The first trace is disposed over the peripheral region of the substrate and electrically connected to the first electrode. The second trace is disposed over the peripheral region of the substrate and electrically connected to the second electrode. The third trace is disposed over the peripheral region of the substrate and electrically connected to the first auxiliary touch electrode.

In some embodiments, the first sub-touch electrodes have a first pitch therebetween, and a distance between the first one of the first sub-auxiliary touch electrodes and the first one of the first sub-touch electrodes is less than the first pitch.

In some embodiments, the second sub-touch electrodes have a second pitch therebetween, and a distance between the second one of the first sub-auxiliary touch electrodes and the first one of the second sub-touch electrodes is less than the second pitch.

In some embodiments, the first one of the first sub-auxiliary touch electrodes is between the first sub-touch electrodes.

In some embodiments, the second one of the first sub-auxiliary touch electrodes is between the second sub-touch electrodes.

In some embodiments, the first auxiliary touch electrode further includes a connection electrode disposed over the peripheral region of the substrate and connecting the first one of the first sub-auxiliary touch electrodes to the second one of the first sub-auxiliary touch electrodes.

In some embodiments, the connection electrode extends along the second direction.

In some embodiments, the first touch electrode further includes a connection electrode disposed over the peripheral region of the substrate and connecting the first sub-touch electrodes to each other.

In some embodiments, the second touch electrode further includes a connection electrode disposed over the peripheral region of the substrate and connecting the second sub-touch electrodes to each other.

In some embodiments, the first touch electrode, the second touch electrode, and the first auxiliary touch electrode are of a same layer.

In some embodiments, the touch panel further includes an insulating layer disposed over the first touch electrode, the second touch electrode, and the first auxiliary touch electrode. The counter touch electrodes are disposed over the insulating layer.

In some embodiments, the touch panel further includes a conductive via disposed in the insulating layer. The third trace is electrically connected to the first auxiliary touch electrode through the conductive via.

In some embodiments, the touch panel further includes a second auxiliary touch electrode. The second auxiliary touch electrode includes plural second sub-auxiliary touch electrodes electrically connected to each other and disposed over the active region of the substrate. Each of the second sub-touch electrodes extends along the first direction. A first one of the second sub-auxiliary touch electrodes is proximate to a second one of the first sub-touch electrodes, and a second one of the second sub-auxiliary touch electrodes is proximate to a second one of the second sub-touch electrodes.

In some embodiments, the first sub-touch electrodes have a first pitch therebetween, and a distance between the first one of the second sub-auxiliary touch electrodes and the second one of the first sub-touch electrodes is less than the first pitch.

In some embodiments, the second sub-touch electrodes have a second pitch therebetween, and a distance between the second one of the second sub-auxiliary touch electrodes and the second one of the second sub-touch electrodes is less than the second pitch.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations.

In the drawings, for clarity, the thickness of layers, films, panels, regions, and the like are enlarged. Throughout the specification, the same reference numerals denote the same elements. It will be understood that when an element such as a layer, a film, a region or a substrate is being "on" or "connected" to another element, the element can be "directly on" or "directly connected" to another element, or intermediate components can also be therebetween. In contrast, when an element is being "directly on the other element" or "directly connected" to another element, there is no intermediate element therebetween. As used herein, "connection" may refer to as both physical and/or electrical connections. Furthermore, "electrical connection" may allow other elements present between the two elements.

Figure 1A:
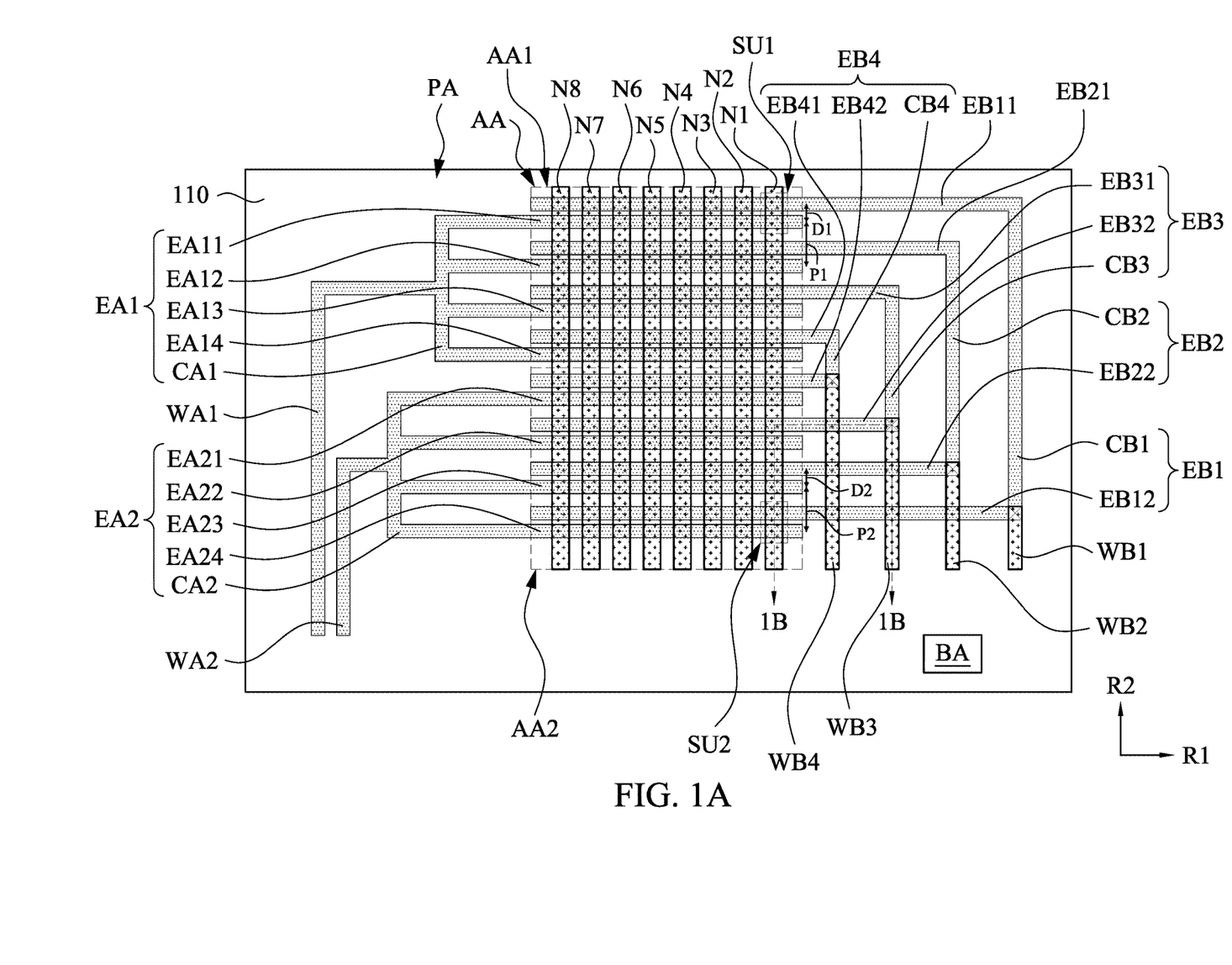
FIG. 1A is a schematic top view of a touch panel according to some embodiments of the present invention.

FIG. 1A is a schematic top view of a touch panel 100 according to some embodiments of the present invention. The touch panel 100 includes a substrate 110, touch electrodes EA1-EA2, auxiliary touch electrodes EB1-EB4, counter touch electrodes N1-N8, and traces WA1-WA2 and WB1-WB4. In some embodiments, the substrate 100 has an active region AA and a peripheral region PA surrounding the active region AA, in which a dashed line in the figure indicates the common boundary between the active region AA and the peripheral region PA. As shown in figure, the touch electrodes EA1-EA2, the auxiliary touch electrodes EB1-EB4, and the counter touch electrodes N1-N8 are disposed over the active region AA and the peripheral region PA of the substrate 110. The traces WA1-WA2 and WB1-WB4 are disposed over the peripheral region PA of the substrate 110, and connected to the touch electrodes EA1-EA2 and the auxiliary touch electrodes EB1-EB4, respectively. It is understood that, in plural embodiments of the present invention, the touch electrodes EA1-EA2, the auxiliary touch electrodes EB1-EB4, and the counter touch electrodes N1-N8 are structurally separated from each other, and therefore electrically disconnected from each other. The traces WA1-WA2 and WB1-WB4 are structurally separated from each other, and therefore electrically disconnected from each other. For easy illustration, in the following description, the active region AA is further divided into two regions AA1 and AA2, and the dashed line in the figure indicates the common boundary between the regions AA1 and AA2. It should be understood that, the dashed line between the regions AA1 and AA2 is arbitrary and simply for illustration.

In some embodiments, the touch electrode EA1 includes plural sub-touch electrodes EA11-EA14 disposed over the region AA1 of the active region AA of the substrate 110 and extending along a first direction R1 to the peripheral region PA, in which the sub-touch electrodes EA11-EA14 are electrically connected to each other. For example, the touch electrode EA1 may include a connection electrode CA1 disposed over the peripheral region PA of the substrate 110 and extending along a second direction R2 to connect the sub-touch electrodes EA11-EA14 to each other. In some embodiments, the second direction R1 intersects the first direction R1, for example, the second direction R1 is orthogonal to the first direction R1.

In some embodiments, the touch electrode EA2 includes plural sub-touch electrodes EA21-EA24 disposed over the region AA2 of the active region AA of the substrate 110 and extending along the first direction R1 to the peripheral region PA, in which the sub-touch electrodes EA21-EA24 are electrically connected to each other. For example, the touch electrode EA2 may include a connection electrode CA2 disposed over the peripheral region PA of the substrate 110 and extending along the second direction R2 to connect the sub-touch electrodes EA21-EA24 to each other.

In some embodiments, the auxiliary touch electrode EB1 includes plural sub-auxiliary touch electrodes EB11-EB12 respectively disposed over the regions AA1-AA2 of the active region AA of the substrate 110 and extending along the first direction R1 to the peripheral region PA, in which the sub-auxiliary touch electrodes EB11-EB12 are electrically connected to each other. For example, the auxiliary touch electrode EB1 may include a connection electrode CB1 disposed over the peripheral region PA of the substrate 110 and extending along the second direction R2 to connect the sub-auxiliary touch electrodes EB11-EB12 to each other.

In some embodiments, the auxiliary touch electrode EB2 includes plural sub-auxiliary touch electrodes EB21-EB22 respectively disposed over the regions AA1-AA2 of the active region AA of the substrate 110 and extending along the first direction R1 to the peripheral region PA, in which the sub-auxiliary touch electrodes EB21-EB22 are electrically connected to each other. For example, the auxiliary touch electrode EB2 may include a connection electrode CB2 disposed over the peripheral region PA of the substrate 110 and extending along the second direction R2 to connect the sub-auxiliary touch electrodes EB21-EB22 to each other.

In some embodiments, the auxiliary touch electrode EB3 includes plural sub-auxiliary touch electrodes EB31-EB32 respectively disposed over the regions AA1-AA2 of the active region AA of the substrate 110 and extending along the first direction R1 to the peripheral region PA, in which the sub-auxiliary touch electrodes EB31-EB32 are electrically connected to each other. For example, the auxiliary touch electrode EB3 may include a connection electrode CB3 disposed over the peripheral region PA of the substrate 110 and extending along the second direction R2 to connect the sub-auxiliary touch electrodes EB31-EB32 to each other.

In some embodiments, the auxiliary touch electrode EB4 includes plural sub-auxiliary touch electrodes EB41-EB42 respectively disposed over the regions AA1-AA2 of the active region AA of the substrate 110 and extending along the first direction R1 to the peripheral region PA, in which the sub-auxiliary touch electrodes EB41-EB42 are electrically connected to each other. For example, the auxiliary touch electrode EB4 may include a connection electrode CB4 disposed over the peripheral region PA of the substrate 110 and extending along the second direction R2 to connect the sub-auxiliary touch electrodes EB41-EB42 to each other.

In some embodiments of the present invention, the sub-touch electrodes EA11-EA14, EA21-EA24, and the sub-auxiliary touch electrodes EB11, EB12, EB21, EB22, EB31, EB21, EB41, EB42 are not intersecting each other, for example, all extending along the first direction R1 herein.

In some embodiments, the counter touch electrodes N1-N8 may extend along the second direction R2, such that each of the counter touch electrodes N1-N8 intersects the sub-touch electrodes EA11-EA14, EA21-EA24, and the sub-auxiliary touch electrodes EB11-EB12, EB21-EB22, EB31-EB32, EB41-EB42.

Through the above configuration, the touch electrodes EA1 and EA2 are respectively over the two regions AA1 and AA2 of the active region AA of the substrate 110, and each of the auxiliary touch electrodes EB1-EB4 extends from the region AA1 where the touch electrode EA1 is located to the region AA2 where the touch electrode EA2 is located. Through the configuration, the touch panel 100 may includes plural touch units (e.g., touch units SU1, SU2), in which each of the touch units includes a portion of one of the touch electrodes EA1 and EA2, a portion of one of the auxiliary touch electrodes EB1-EB4, and a portion of one of the counter touch electrodes N1-N8.

In the present embodiments, the portions of the touch electrodes EA1 and EA2 and the auxiliary touch electrodes EB1-EB4 are illustrated as transmitting electrodes, and the portions of the counter touch electrodes N1-N8 are illustrated as sensing electrodes. In other words, each of the touch units includes two transmitting electrodes and one sensing electrode. For example, the touch unit SU1 includes a portion of the touch electrode EA1 (e.g., the sub-touch electrode EA11) as the transmitting electrode, a portion of the auxiliary touch electrode EB1 (e.g., the sub-auxiliary touch electrode EB11) as the transmitting electrode, and a portion of the counter touch electrode N1 as the sensing electrode. The touch units SU2 includes a portion of the touch electrode EA2 (e.g., the sub-touch electrode EA24) as the transmitting electrode, a portion of the auxiliary touch electrode EB1 (e.g., the sub-auxiliary touch electrode EB12) as the transmitting electrode, and a portion of the counter touch electrode N1 as the sensing electrode.

In the above configuration, each of the touch units may provide time-sequential transmitting signals through the two transmitting electrodes, and detecting a sensing signal through the sensing electrode. Such configuration is beneficial to reduce the number of the traces regarding the transmitting electrodes. For example, when the touch units are arranged in an 8×8 array, by designing the two transmitting electrodes (e.g., the touch electrodes EA1 and EA2) to positionally interfere with the four transmitting electrodes (e.g., the auxiliary touch electrode EB1-EB4), 8 (2 multiplied by 4) forms of time-sequential transmitting signals may be provided to the touch units in respective rows of the same column, such that the counter touch electrodes N1-N8 in different columns may sense and obtain touch signals. The sensing method will be described in detail later with FIG. 2.

In some embodiments, for achieving the sensing effect, each of the sub-auxiliary touch electrodes EB11-EB41 of the auxiliary touch electrodes EB1-EB4 may be respectively proximate to the sub-touch electrodes EA11-EA14 of the touch electrode EA1, and each of the sub-auxiliary touch electrodes EB12-EB42 of the auxiliary touch electrodes EB1-EB4 may be respectively proximate to the sub-touch electrodes EA21-EA24 of the touch electrode EA2. For example, adjacent two of the sub-touch electrodes EA11-EA14 has a pitch P1 therebetween, and each of the sub-auxiliary touch electrodes EB11-EB41 has a distance D1 from the adjacent one of the sub-touch electrodes EA11-EA14, in which the distance D1 is less than the pitch P1. For example, adjacent two of the sub-touch electrodes EA21-EA24 has a pitch P2 therebetween, and each of the sub-auxiliary touch electrodes EB12-EB42 has a distance D2 from the adjacent one of the sub-touch electrodes EA21-EA24, in which the distance D2 is less than the pitch P2. Through the configuration, as shown in the figure, the sub-auxiliary touch electrodes EB21, EB31, EB41 may be disposed between two adjacent touch electrodes EA11-EA14. In some embodiments, the sub-auxiliary touch electrodes EB12, EB22, EB32 may be disposed between two adjacent touch electrodes EA21-EA24.

Figure 1B:
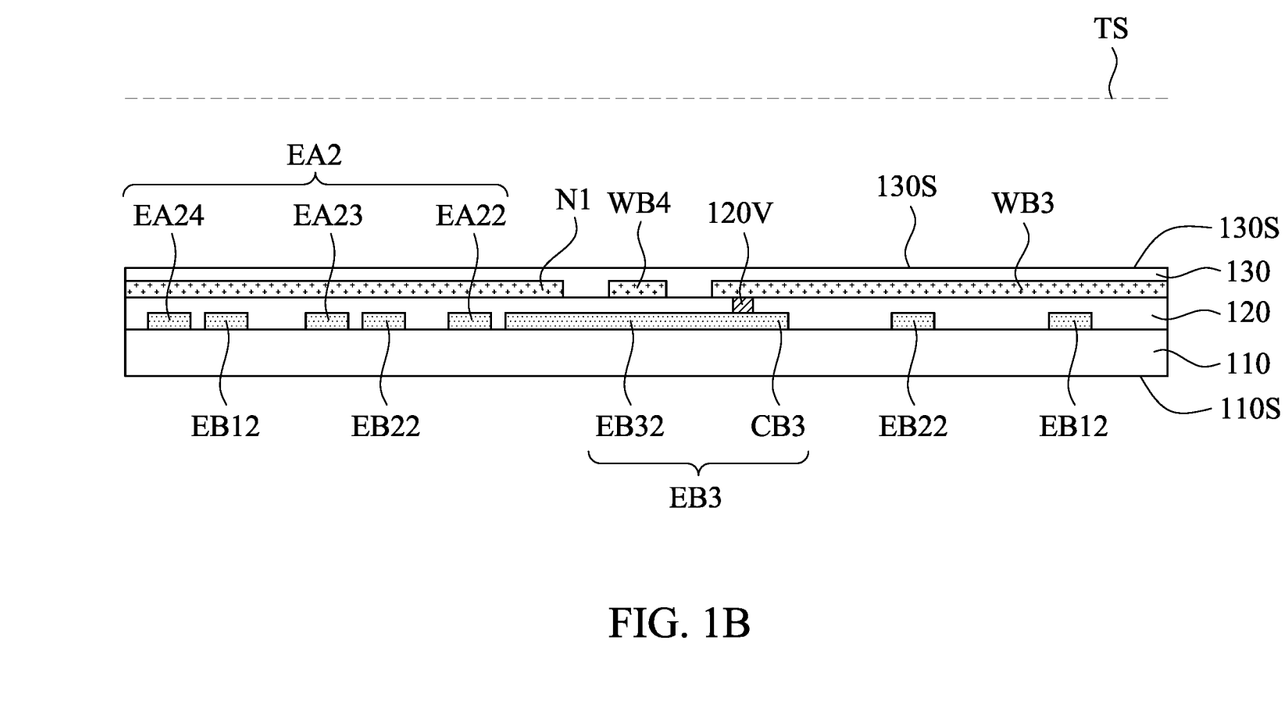
FIG. 1B is a schematic cross-sectional view taken along line 1B-1B of FIG. 1A.

FIG. 1B is a schematic cross-sectional view taken along line 1B-1B of FIG. 1A. In some embodiments, the touch panel 100 may include an insulating layer 120 and plural conductive vias 120V. Referring to FIGS. 1A and 1B, the insulating layer 120 may be disposed over the touch electrodes EA1, EA2, the auxiliary touch electrodes EB1-EB4, and the traces WA1-WA2. The counter touch electrodes N1-N8 and the traces WB1-WB4 may be disposed over the insulating layer 120. The conductive vias 120V may be disposed in the insulating layer 120, in which ends of the traces WB1-WB4 are respectively electrically connected to the auxiliary touch electrodes EB1-EB4 through the conductive vias 120V. As shown in FIG. 1B, the trace WB3 is electrically connected to the auxiliary touch electrode EB3 through the conductive vias 120V. In some embodiments, other ends of the traces WB1-WB4 are connected to bonding pads in a bonding region BA (referring to FIG. 1B) and therefore electrically connected to a suitable drive/read circuit or chip.

In some embodiments of the present invention, the touch electrodes EA1, EA2, the auxiliary touch electrodes EB1-EB4, and the counter touch electrodes N1-N8 may be made of suitable transparent conductive materials, such as metal-oxide conductive material (e.g., indium tin oxide, indium zinc oxide, aluminum tin oxide, aluminum zinc oxide, indium gallium zinc oxide), metal mesh (e.g., silver mesh or copper mesh), polymer doped with conductive particles (e.g., silver or copper particles), etc. The touch electrodes EA1, EA2 and the auxiliary touch electrodes EB1-EB4 may be of the same layer, and the counter touch electrodes N1-N8 may be of another same layer.

For example, a suitable transparent conductive layer may be formed over the substrate 110, and the transparent conductive layer is patterned to form the sub-touch electrodes EA11-EA14 and EA21-EA24 of the touch electrodes EA1, EA2 and the sub-auxiliary touch electrodes EB11, EB12, EB21, EB22, EB31, EB32, EB41, EB42 of the auxiliary touch electrodes EB1-EB4. Subsequently, the insulating layer 120 is formed over the sub-touch electrodes EA11-EA14 and EA21-EA24 of the touch electrodes EA1, EA2 and the sub-auxiliary touch electrodes EB11, EB12, EB21, EB22, EB31, EB32, EB41, EB42 of the auxiliary touch electrodes EB1-EB4, in which the insulating layer 120 may be made of suitable insulating materials, such as silicon dioxide. Afterwards, another transparent conductive layer may be formed over the insulating layer 120, and the another transparent conductive layer is patterned to form the counter touch electrodes N1-N8. In some embodiments, a protection layer 130 may be optionally disposed over the counter touch electrodes N1-N8, in which the protection layer 130 may be made of suitable insulating materials, such as silicon dioxide. It is noted that, in another example, the counter touch electrodes N1-N8 may be disposed below the touch electrodes EA1, EA2 and the auxiliary touch electrodes EB1-EB4, of which the fabrication method may be inferred accordingly, and therefore not repeated herein.

In some embodiments, the connection electrodes CB1-CB4 may be formed together with the sub-auxiliary touch electrodes EB11, EB12, EB21, EB22, EB31, EB32, EB41, EB42 of the auxiliary touch electrodes EB1-EB4 by patterning the same transparent conductive layer. The connection electrodes CB1-CB4 may be disposed for cooperating with the sub-auxiliary touch electrodes. For example, the outermost sub-auxiliary touch electrodes (i.e., the sub-auxiliary touch electrodes EB11, EB12) in the regions AA1 and AA2 are connected to each other through the connection electrode CB1, and the innermost sub-auxiliary touch electrodes (i.e., the sub-auxiliary touch electrodes EB41, EB42) in the regions AA1 and AA2 are connected to each other through the connection electrode CB4. In some other embodiments, the connection electrodes CB1-CB4 may not be formed together with the sub-auxiliary touch electrodes of the auxiliary touch electrodes by patterning the same transparent conductive layer. For example, the connection electrodes CB1-CB4 may be formed together with the counter touch electrodes N1-N8 by patterning the same conductive layer.

In some embodiments of the present invention, the traces WA1, WA2, WB1-WB4 may be made of various conductive materials having good electrical conductance, such as metal (e.g., copper or silver) or suitable transparent conductive materials (e.g., indium tin oxide, indium zinc oxide). Herein, the traces WA1, WA2 may be formed together with the touch electrodes EA1, EA2 and the auxiliary touch electrodes EB1-EB4 by patterning the same conductive layer; and the traces WB1-WB4 may be formed together with the counter touch electrodes N1-N8 by patterning the same conductive layer. In some other embodiments, the traces WA1 and WA2 may not be formed together with the touch electrodes EA1 and EA2 and the auxiliary touch electrodes EB1-EB4. For example, similar to the traces WB1-WB4, the traces WA1 and WA2 may be formed over the insulating layer 120 together with the counter touch electrodes N1-N8, such that the traces WA1, WA2, and WB1-WB4 are connected to the touch electrodes EA1 and EA2 and the auxiliary touch electrodes EB1-EB4 through the conductive vias 120V, respectively. Alternatively, the traces WA1 and WA2 may be formed over other layers above the insulating layer 120. In some other embodiments, the traces WB1-WB4 may not be formed together with the counter touch electrodes N1-N8. For example, the traces WB1-WB4 may be formed over other layers above the insulating layer 120.

In some embodiments of the present invention, materials of the substrate may be, for example, glass, quarts, organic polymers, metal, or other suitable materials. The substrate 110 may be a rigid substrate or a flexible substrate. The substrate 110 may be a transparent substrate.

In the examples of the present invention, the counter electrodes N1-N8 are electrically isolated from the touch electrodes EA1 and EA2 and the auxiliary touch electrodes EB1-EB4 simply by the insulating layer 120, but it should not limit the scope of the present invention. In some other embodiments, the counter electrodes N1-N8, the touch electrodes EA1 and EA2, and the auxiliary touch electrodes EB1-EB4 may be formed by patterning the same transparent conductive layer, in which the counter electrodes N1-N8 are electrically isolated from the touch electrodes EA1 and EA2 and the auxiliary touch electrodes EB1-EB4 by suitable insulating blocks.

Alternatively, in some other embodiments, the touch panel 100 may be applicable to various devices, and therefore according to product design, plural other layers may be disposed between the counter touch electrodes N1-N8 and the touch electrodes EA1 and EA2 (and/or the auxiliary touch electrodes EB1-EB4). In some examples where the touch panel 100 is applicable to a touch liquid crystal display device, liquid crystal layer, color filter, glass, other material or the combination thereof, may be disposed between the counter touch electrodes N1-N8 and the touch electrodes EA1 and EA2 (and/or the auxiliary touch electrodes EB1-EB4). In some examples where the touch panel 100 is applicable to a touch display device, the active region AA of the substrate 110 would overlap with a display region of a display panel, and the peripheral region PA would overlap with a peripheral region of the display panel around the display region of the display panel.

In the present embodiments where the portions of the touch electrodes EA1 and EA2 and the auxiliary touch electrodes EB1-EB4 act as transmitting electrodes, and the counter touch electrode N1-N8 act as sensing electrodes, in case that the transmitting signals interfere the sensing signals, a touch surface TS may be disposed on a side of the counter touch electrode N1-N8 opposite to the touch electrodes EA1 and EA2 and the auxiliary touch electrodes EB1-EB4. In some embodiments, the touch surface TS may be a top surface 130S of the protection layer 130. Alternatively, in other embodiments, other layer or substrate (e.g., cover lens) may be disposed over the protection layer 130, and the touch surface TS is a surface of the layer or substrate (e.g., cover lens).

Figure 2:
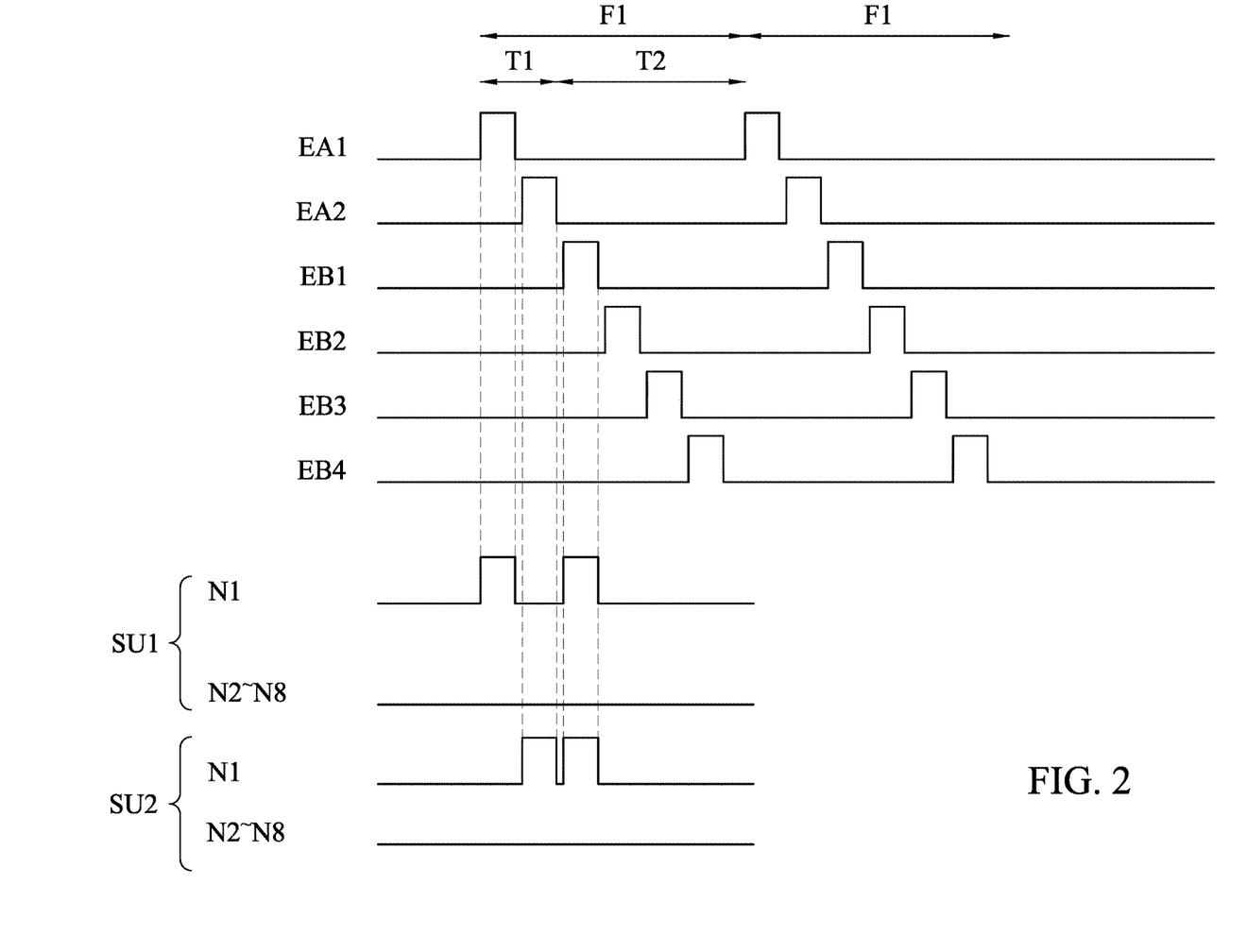
FIG. 2 is a signal diagram of the operation of a touch panel according to some embodiments of the present invention.

FIG. 2 is a signal diagram of the operation of a touch panel 100 according to some embodiments of the present invention. Reference is made to FIG. 1A and FIG. 2. The drive/read circuit scans the touch electrodes EA1 and EA2 and the auxiliary touch electrodes EB1-EB4 through the bonding region BA. In each scan period F1, the drive/read circuit provides transmitting signals to the touch electrodes EA1 and EA2 and the auxiliary touch electrodes EB1-EB4 at different time points. Herein, the scan period F1 is designed as a time period in which a finger touch can be responsively sensed by the touch panel.

When the touch surface TS is touched by user's finger, the sensing electrode N1-N8 of corresponding touch units would sense the transmitting signals of the transmitting electrodes EA1 or EA2 and thereby generate a first sensing signal at first time point T1, and sense the transmitting signals of the transmitting electrodes EB1-EB4 and thereby generate a second sensing signal at second time point T2, the first and second sensing signals are sent back to the control circuit, and then a touch position is calculated based on the first and second sensing signals.

For easy illustration, FIG. 2 is illustrated in the cases that a user touches the touch units SU1, SU2, and for brief illustration, the sensing signals of the touch units SU1, SU2 are shown in the same figure. It should be understood that the sensing signals of the touch units SU1, SU2 indicate the case that the user touches one of the touch units SU1, SU2.

In some examples where the user touches the touch unit SU1, the sensing electrode N1 would sense the transmitting signal of the transmitting electrode EA1 and thereby generate a first sensing signal at first time point, and sense the transmitting signal of the transmitting electrode EB1 and thereby generate a second sensing signal at second time point. Through the configuration, a touch position can be calculated based on the first and second sensing signals.

In some examples where the user touches the touch unit SU2, the sensing electrode N1 would sense the transmitting signal of the transmitting electrode EA2 and thereby generate a first sensing signal at first time point, and sense the transmitting signal of the transmitting electrode EB1 and thereby generate a second sensing signal at second time point. Through the configuration, a touch position can be calculated based on the first and second sensing signals. As such, a touch position (x, y) (e.g., the position where the touch unit SU1 is located; or the position where the touch unit SU2 is located) can be determined by the operation of three electrodes (e.g., the electrodes N1, EA1, and EB1; or the electrodes N1, EA2, and EB1).

Figure 3A:
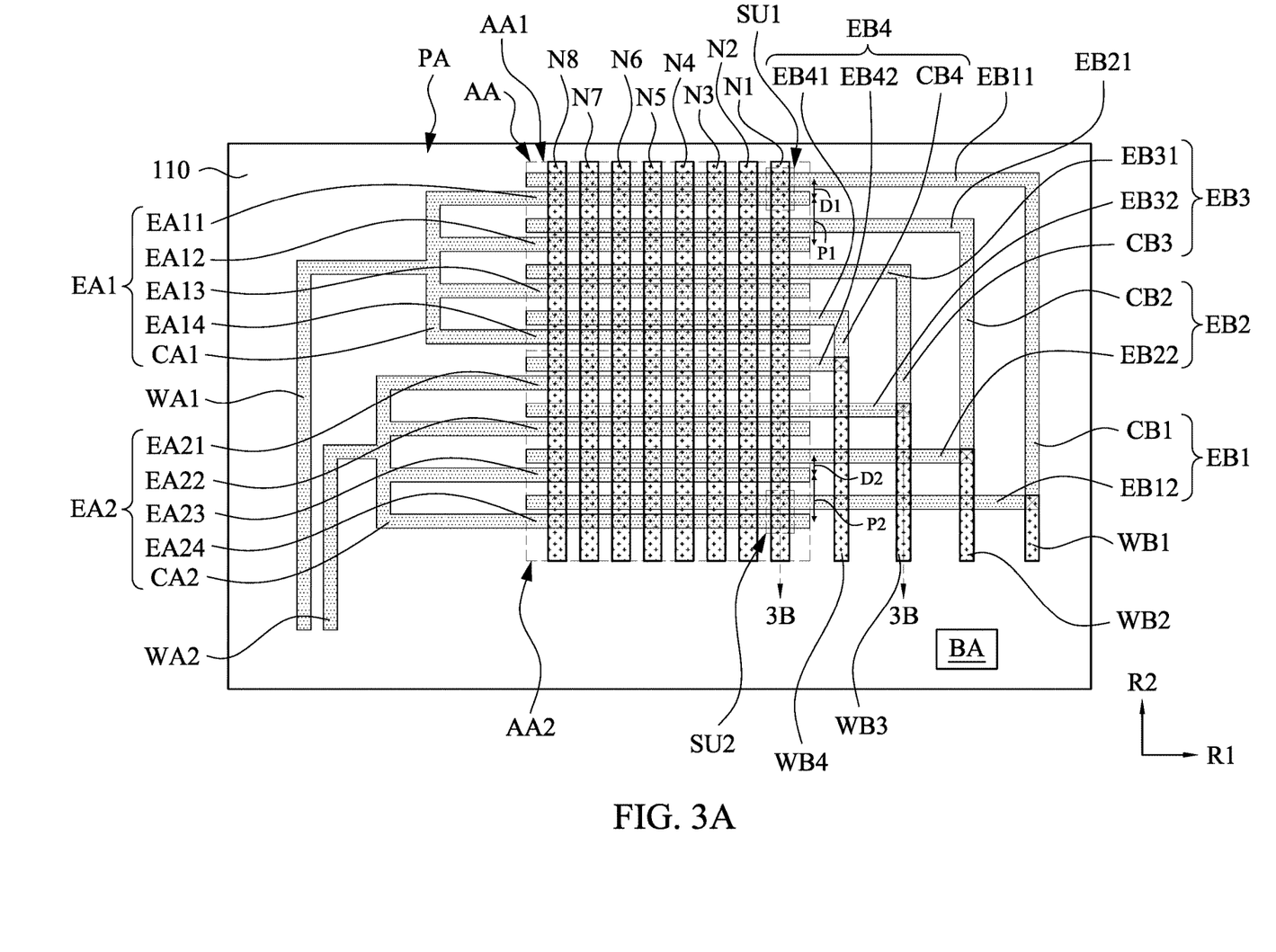
FIG. 3A is a schematic top view of a touch panel according to some embodiments of the present invention.
Figure 3B:
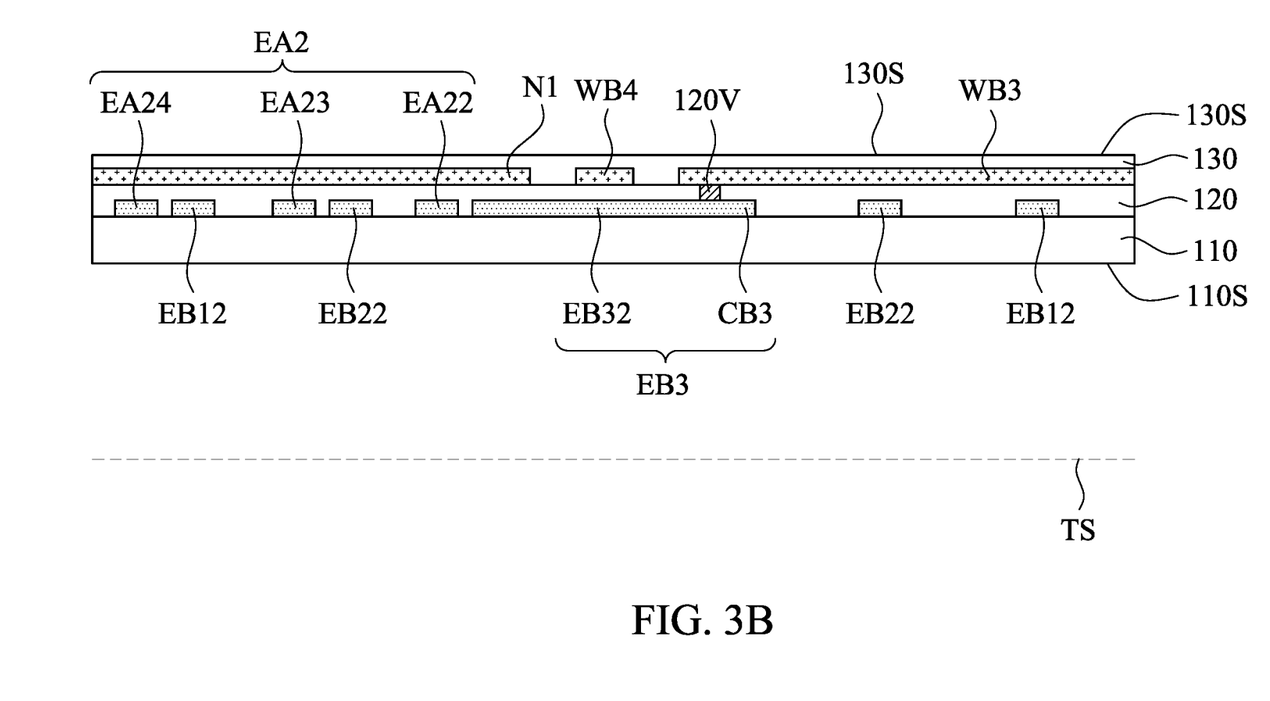
FIG. 3B is a schematic cross-sectional view taken along line 3B-3B of FIG. 3A.

FIG. 3A is a schematic top view of a touch panel 100 according to some embodiments of the present invention. FIG. 3B is a schematic cross-sectional view taken along line 3B-3B of FIG. 3A. The present embodiments are similar to the embodiments of FIGS. 1A and 1B, and the difference between the present embodiments and the embodiments of FIGS. 1A and 1B is that: in the present embodiments, the touch electrodes EA1 and EA2 and the auxiliary touch electrodes EB1-EB4 act as sensing electrodes, and the counter touch electrode N1-N8 act as transmitting electrodes. In other words, each of the touch units includes one transmitting electrode and two sensing electrodes. For example, the touch unit SU1 includes a portion of the touch electrode EA1 (e.g., the sub-touch electrode EA11) as the sensing electrode, a portion of the auxiliary touch electrode EB1 (e.g., the sub-auxiliary touch electrode EB11) as the sensing electrode, and a portion of the counter touch electrode N1 as the transmitting electrode. The touch units SU2 includes a portion of the touch electrode EA2 (e.g., the sub-touch electrode EA24) as the sensing electrode, a portion of the auxiliary touch electrode EB1 (e.g., the sub-auxiliary touch electrode EB12) as the sensing electrode, and a portion of the counter touch electrode N1 as the transmitting electrode.

Reference is made to FIGS. 3A and 3B. In the present embodiments where the portions of the touch electrodes EA1 and EA2 and the auxiliary touch electrodes EB1-EB4 act as sensing electrodes, and the counter touch electrode N1-N8 act as transmitting electrodes, in case that the transmitting signals interfere the sensing signals, a touch surface TS may be disposed on a side of the touch electrodes EA1 and EA2 and the auxiliary touch electrodes EB1-EB4 opposite to the counter touch electrode N1-N8. In some embodiments, the touch surface TS may be a bottom surface 110S of the substrate 110. Alternatively, in other embodiments, other layer or substrate (e.g., cover lens) may be disposed below the substrate 110, and the touch surface TS is a surface of the layer (e.g., cover lens).

In the above configuration, each of the touch units may provide a transmitting signal through the transmitting electrode, and detecting sensing signals through the two sensing electrode. Such configuration is beneficial to reduce the number of the traces regarding the sensing electrodes. For example, when the touch units are arranged in an 8×8 array, by designing the two sensing electrodes (e.g., the touch electrodes EA1 and EA2) to positionally interfere with the four sensing electrodes (e.g., the auxiliary touch electrodes EB1-EB4), 8 (2 multiplied by 4) forms of time-sequential sensing signals may be detected by the touch units in respective rows of the same column, such that it can be identified that which sensing unit is touched. The sensing method will be described in detail later with FIG. 4.

Figure 4:
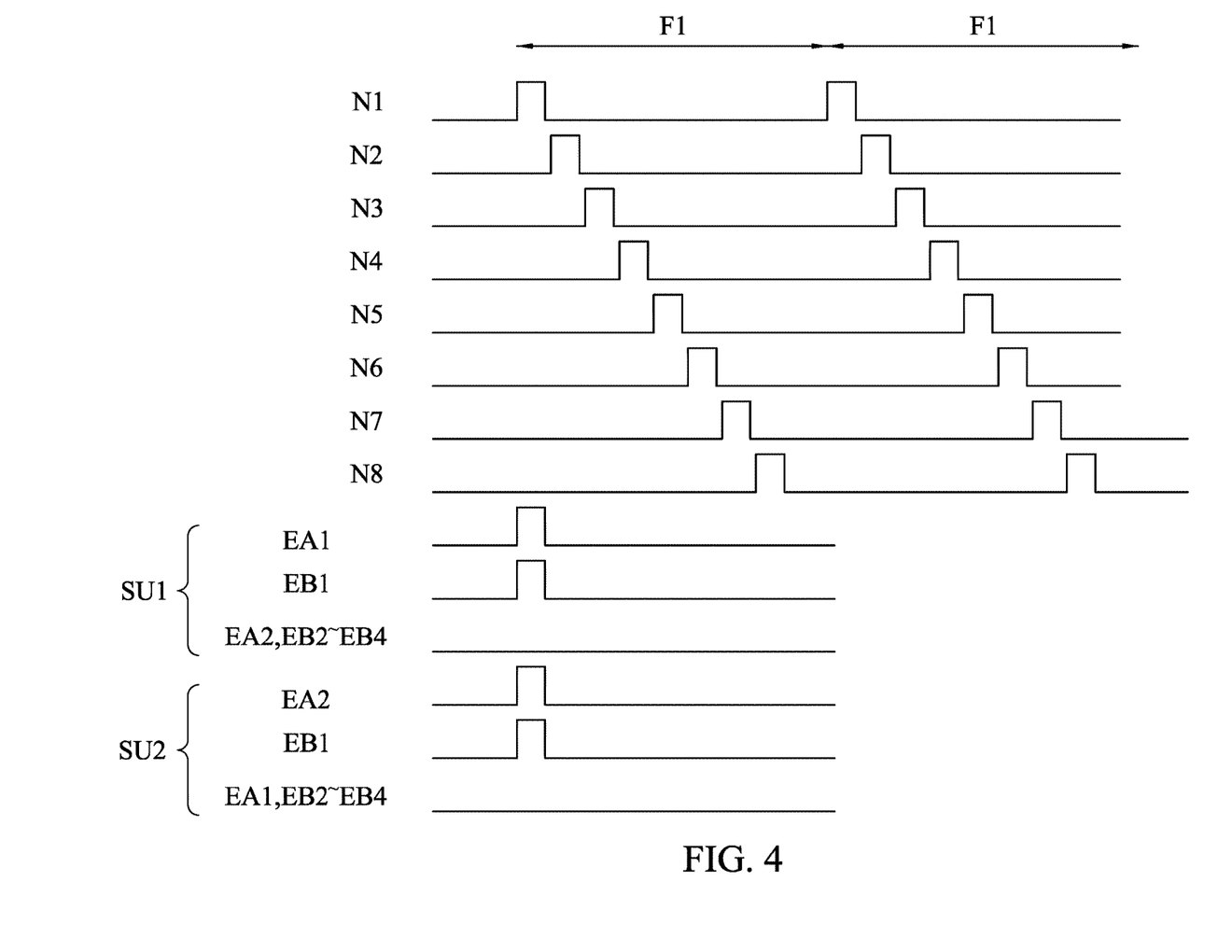
FIG. 4 is a signal diagram of the operation of a touch panel according to some embodiments of the present invention.

FIG. 4 is a signal diagram of the operation of the touch panel 100 according to some embodiments of the present invention. Reference is made to FIG. 3A and FIG. 4. The drive/read circuit scans the transmitting electrodes N1-N8 through the bonding region BA, and provides transmitting signals to the transmitting electrodes N1-N8 at different time points in each scan period F1. For easy illustration, FIG. 4 is illustrated in the cases that a user touches the touch units SU1, SU2, and for brief illustration, the sensing signals of the touch units SU1, SU2 are shown in the same figure. It should be understood that the sensing signals of the touch units SU1, SU2 indicate the case that the user touches one of the touch units SU1, SU2.

When the touch surface TS is touched by user's finger, one of the sensing electrodes EA1 and EA2 and one of the sensing electrodes EB1-EB4 of corresponding touch units would sense the transmitting signal of one of the transmitting electrodes N1-N8 at the same time point, and thereby generate sensing signals, the sensing signals are sent back to the control circuit, and a touch position is calculated based on the sensing signals.

In some examples where the user touches the touch unit SU1, the sensing electrodes EA1 and EB1 would sense the transmitting signal of the transmitting electrode N1 at the same time point and thereby generate sensing signals, such that a touch position can be calculated based on the sensing signals. Other sensing electrodes EA2 and EB2-EB4 would not sense the transmitting signal and therefore would not generate sensing signals.

In some examples where the user touches the touch unit SU2, the sensing electrodes EA2 and EB1 would sense the transmitting signal of the transmitting electrode N1 at the same time point and thereby generate sensing signals, such that a touch position can be calculated based on the sensing signals. Other sensing electrodes EA1 and EB2-EB4 would not sense the transmitting signal and therefore would not generate sensing signals. As such, a touch position (x, y) (e.g., the position where the touch unit SU1 is located; or the position where the touch unit SU2 is located) can be determined by the operation of three electrodes (e.g., the electrodes EA1, EB1, and N1; or the electrodes EA2, EB1, and N1.

Figure 5:
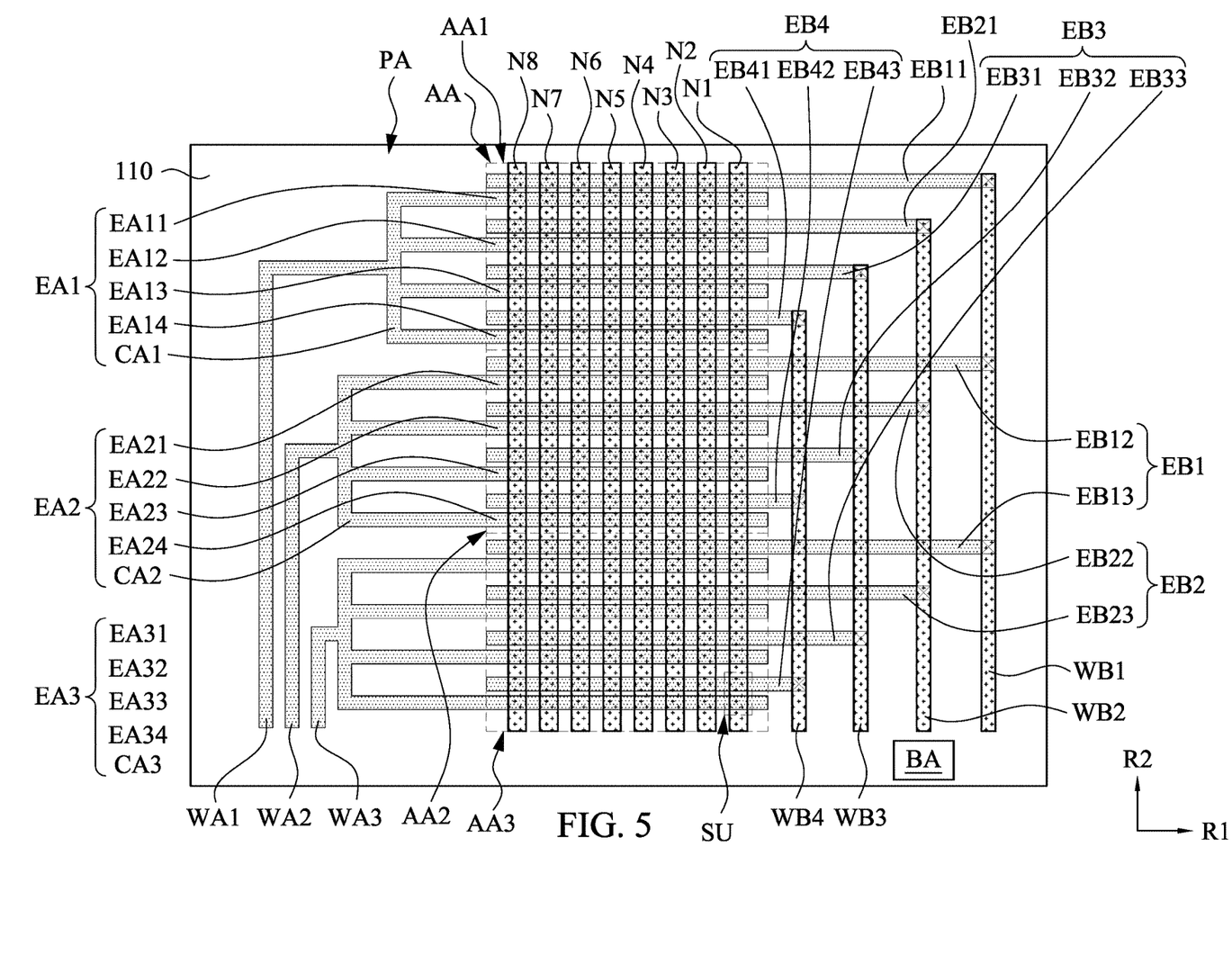
FIG. 5 is a schematic top view of a touch panel according to some embodiments of the present invention.

FIG. 5 is a schematic top view of a touch panel 100 according to some embodiments of the present invention. The present embodiments are similar to the embodiments of FIG. 1A, and the difference between the present embodiments and the embodiments of FIG. 1A is that: in the present embodiments, the touch panel 100 includes touch electrodes EA1-EA3, auxiliary touch electrode EB1-EB4, counter electrodes N1-N8, and traces WA1-WA3 and WB1-WB4. The touch electrodes EA1-EA3, auxiliary touch electrode EB1-EB4, counter electrodes N1-N8 are over the active region AA and the peripheral region PA of the substrate 110. The traces WA1-WA3 and WB1-WB4 are disposed over the peripheral region PA of the substrate 110, and connected to the touch electrodes EA1-EA3 and the auxiliary touch electrodes EB1-EB4, respectively. For easy illustration, in the following description, the active region AA is further divided into three regions AA1-AA3, and the dashed lines in the figure indicate the common boundary between the regions AA1-AA3. It should be understood that, the dashed line between the regions AA1 and AA2 and the dashed line between the regions AA2 and AA3 are arbitrary and simply for illustration.

As pervious embodiments, the touch electrodes EA1-EA3 may respectively includes plural sub-touch electrodes EA11-EA14, EA21-EA24, and EA31-EA34 respectively disposed over the regions AA1-AA3 of the active region AA of the substrate 110 and extending along the first direction R1, in which the sub-touch electrodes EA11-EA14 are electrically connected to each other, the sub-touch electrodes EA21-EA24 are electrically connected to each other, and the sub-touch electrodes EA31-EA34 are electrically connected to each other. For example, the touch electrodes EA1-EA3 may respectively include connection electrodes CA1-CA3 disposed over the peripheral region PA of the substrate 110 and extending along the second direction R2. The connection electrode CA1 may connect the sub-touch electrodes EA11-EA14 to each other. The connection electrode CA2 may connect the sub-touch electrodes EA21-EA24 to each other. The connection electrode CA3 may connect the sub-touch electrodes EA31-EA34 to each other.

As pervious embodiments, the auxiliary touch electrode EB1-EB4 may respectively include sub-auxiliary touch electrodes EB11-EB13, EB21-EB23, EB31-EB33, and EB41-EB43, disposed over the active region AA of the substrate 110 and extending along the first direction R1. Herein, the sub-auxiliary touch electrodes EB11-EB13 are electrically connected to each other, the sub-auxiliary touch electrodes EB21-EB23 are electrically connected to each other, the sub-auxiliary touch electrodes EB31-EB33 are electrically connected to each other, and the sub-auxiliary touch electrodes EB41-EB43 are electrically connected to each other. For example, herein, the trace WB1 connects the sub-auxiliary touch electrodes EB11-EB13 to each other, the trace WB2 connects the sub-auxiliary touch electrodes EB21-EB23 to each other, the trace WB3 connects the sub-auxiliary touch electrodes EB31-EB33 to each other, and the trace WB4 connects the sub-auxiliary touch electrodes EB41-EB43 to each other. In some other embodiments, the sub-auxiliary touch electrodes of each of the auxiliary touch electrodes EB1-EB4 may be connected to each other by other means.

In some embodiments, the touch electrodes EA1-EA3 are respectively disposed over three regions AA1-AA3 of the substrate 110, and each of the auxiliary touch electrodes EB1-EB4 includes three sub-auxiliary touch electrodes respectively disposed over the regions AA1-AA3 where the touch electrodes EA1-EA3 is located. Through the configuration, the touch panel 100 may include plural touch units SU, in which each of the touch units SU includes a portion of one of the touch electrodes EA1-EA3, a portion of one of the auxiliary touch electrodes EB1-EB4, and a portion of one of the counter touch electrodes N1-N8.

As aforementioned, in some embodiments, portions of the touch electrodes EA1-EA3 and the auxiliary touch electrodes EB1-EB4 act as transmitting electrodes, and portions of the counter touch electrodes N1-N8 act as sensing electrodes. Alternatively, in other embodiments, portions of the touch electrodes EA1-EA3 and the auxiliary touch electrodes EB1-EB4 act as sensing electrodes, and portions of the counter touch electrodes N1-N8 act as transmitting electrodes. In the present embodiments, the touch units are arranged in an 8×12 array, by designing the three sensing electrodes (e.g., the touch electrodes EA1-EA3) to positionally interfere with the four sensing electrodes (e.g., the auxiliary touch electrodes EB1-EB4), the number of the traces regarding the transmitting electrodes may be reduced.

Through the above embodiments, it is concluded that the number of the touch electrodes EA1-EA3 (for example, 3 herein) may determine the number of the sub-auxiliary touch electrodes of each of the auxiliary touch electrodes EB1-EB4, and the number of the sub-touch electrodes of each of the touch electrodes EA1-EA3 (for example, 4 herein) may determine the number of the auxiliary touch electrodes EB1-EB4. It should be understood that, the number of the touch electrodes EA1-EA3 (i.e., the number of the regions AA1-AA3) and the number of the auxiliary touch electrodes EB1-EB4 may be designed according to actual conditions, and not limited to those shown in the figure.

In plural embodiments of the present invention, by designing each of the touch units to have two transmitting electrodes and one sensing electrode, or designing each of the touch units to have one transmitting electrode and two sensing electrodes, a touch position may be determined through the three electrodes. Such configuration may be beneficial to reduce the number of the traces regarding the transmitting electrodes or the receiving electrodes. Through the configuration, a narrow border design may be realized, or some shielding wires may be added to the peripheral region for electrically shielding adjacent traces, which in turn will improve the touch performance of the touch panel. The details of the present embodiments are similar to the embodiments of FIG. 1A to FIG. 2 or the embodiments of FIG. 3A to FIG. 4, and therefore not repeated herein.

Although the present disclosure has been described in considerable detail with reference to certain embodiments thereof, the present invention is not limited thereto. It will be apparent to those skilled in the art that various modifications and variations can be made without departing from the scope or spirit of the invention. The scope of the invention is, therefore, indicated by the appended claims

What is claimed is:

1. A touch panel, comprising:
    a substrate having an active region and a peripheral region;
    a first touch electrode comprising a plurality of first sub-touch electrodes electrically connected to each other and disposed over the active region of the substrate;
    a second touch electrode comprising a plurality of second sub-touch electrodes electrically connected to each other and disposed over the active region of the substrate;
    a first auxiliary touch electrode comprising a plurality of first sub-auxiliary touch electrodes electrically connected to each other and disposed over the active region of the substrate, wherein each of the first sub-touch electrodes, the second sub-touch electrodes, and the first sub-auxiliary touch electrodes extends along a first direction, wherein a first one of the first sub-auxiliary touch electrodes is proximate to a first one of the first sub-touch electrodes, and a second one of the first sub-auxiliary touch electrodes is proximate to a first one of the second sub-touch electrodes;
    a plurality of counter touch electrodes spaced apart from each other and over the active region of the substrate, wherein the counter touch electrodes respectively extend along a second direction intersecting the first direction;
    a first trace disposed over the peripheral region of the substrate and electrically connected to the first electrode;
    a second trace disposed over the peripheral region of the substrate and electrically connected to the second electrode; and
    a third trace disposed over the peripheral region of the substrate and electrically connected to the first auxiliary touch electrode.

2. The touch panel of claim 1, wherein the first sub-touch electrodes have a first pitch therebetween, and a distance between the first one of the first sub-auxiliary touch electrodes and the first one of the first sub-touch electrodes is less than the first pitch.

3. The touch panel of claim 1, wherein the second sub-touch electrodes have a second pitch therebetween, and a distance between the second one of the first sub-auxiliary touch electrodes and the first one of the second sub-touch electrodes is less than the second pitch.

4. The touch panel of claim 1, wherein the first one of the first sub-auxiliary touch electrodes is between the first sub-touch electrodes.

5. The touch panel of claim 1, wherein the second one of the first sub-auxiliary touch electrodes is between the second sub-touch electrodes.

6. The touch panel of claim 1, wherein the first auxiliary touch electrode further comprises:
a connection electrode disposed over the peripheral region of the substrate and connecting the first one of the first sub-auxiliary touch electrodes to the second one of the first sub-auxiliary touch electrodes.

7. The touch panel of claim 1, wherein the connection electrode extends along the second direction.

8. The touch panel of claim 1, wherein the first touch electrode further comprises:
a connection electrode disposed over the peripheral region of the substrate and connecting the first sub-touch electrodes to each other.

9. The touch panel of claim 1, wherein the second touch electrode further comprises:
a connection electrode disposed over the peripheral region of the substrate and connecting the second sub-touch electrodes to each other.

10. The touch panel of claim 1, wherein the first touch electrode, the second touch electrode, and the first auxiliary touch electrode are of a same layer.

11. The touch panel of claim 1, further comprising:
an insulating layer disposed over the first touch electrode, the second touch electrode, and the first auxiliary touch electrode, wherein the counter touch electrodes are disposed over the insulating layer.

12. The touch panel of claim 11, further comprising:
a conductive via disposed in the insulating layer, wherein the third trace is electrically connected to the first auxiliary touch electrode through the conductive via.

13. The touch panel of claim 1, further comprising:
a second auxiliary touch electrode comprising a plurality of second sub-auxiliary touch electrodes electrically connected to each other and disposed over the active region of the substrate, wherein each of the second sub-touch electrodes extends along the first direction, wherein a first one of the second sub-auxiliary touch electrodes is proximate to a second one of the first sub-touch electrodes, and a second one of the second sub-auxiliary touch electrodes is proximate to a second one of the second sub-touch electrodes.

14. The touch panel of claim 13, wherein the first sub-touch electrodes have a first pitch therebetween, and a distance between the first one of the second sub-auxiliary touch electrodes and the second one of the first sub-touch electrodes is less than the first pitch.

15. The touch panel of claim 13, wherein the second sub-touch electrodes have a second pitch therebetween, and a distance between the second one of the second sub-auxiliary touch electrodes and the second one of the second sub-touch electrodes is less than the second pitch.

* * * * *